United States Patent
Xu et al.

(10) Patent No.: US 11,271,790 B2
(45) Date of Patent: Mar. 8, 2022

(54) INTERCONNECTION DEVICE, COMMUNICATION METHOD, AND SYSTEM INCLUDING ROBOT

(71) Applicants: Siemens Aktiengesellschaft, Munich (DE); Wen Kang Xu, Shanghai (CN); Shun Jie Fan, Beijing (CN)

(72) Inventors: Wen Kang Xu, Shanghai (CN); Shun Jie Fan, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/257,920

(22) PCT Filed: Aug. 1, 2018

(86) PCT No.: PCT/CN2018/098129
§ 371 (c)(1),
(2) Date: Jan. 5, 2021

(87) PCT Pub. No.: WO2020/024183
PCT Pub. Date: Feb. 6, 2020

(65) Prior Publication Data
US 2021/0247733 A1    Aug. 12, 2021

(51) Int. Cl.
*G05B 19/05* (2006.01)
*H04L 69/08* (2022.01)

(52) U.S. Cl.
CPC ...... *H04L 29/06068* (2013.01); *G05B 19/052* (2013.01); *G05B 19/054* (2013.01); *G05B 19/058* (2013.01)

(58) Field of Classification Search
CPC ............ H04L 29/06068; G05B 19/054; G05B 19/058; G05B 19/052
See application file for complete search history.

(56) References Cited

U.S. PATENT DOCUMENTS

2012/0061155 A1\* 3/2012 Berger ............... B25J 5/007
180/21
2014/0142754 A1  5/2014 Dai et al.
(Continued)

FOREIGN PATENT DOCUMENTS

CN    101870025 A    10/2010
CN    105945944 A     9/2016
(Continued)

OTHER PUBLICATIONS

International Search Report PCT/ISA/210 and Written Opinion of the International Searching Authority PCT/ISA/237 for International Application No. PCT/CN2018/098129 dated Mar. 13, 2019.
(Continued)

*Primary Examiner* — Lakeram Jangbahadur
(74) *Attorney, Agent, or Firm* — Harness, Dickey & Pierce, P.L.C.

(57) ABSTRACT

An interconnection device, a communication method, and a system including a robot are disclosed. In an embodiment, the interconnection device includes a first OPC UA interface, configured to establish connection between the interconnection device and an OPC UA device; and an ROS interface, in communication with the first OPC UA interface. The ROS interface includes: at least one ROS node module, configured to perform communication between the OPC UA device and an ROS device; an ROS client library module, configured to provide a function library to be called when the ROS node module performs the communication; and an ROS core module, configured to manage the ROS node module in the ROS interface unit and a node module in the ROS device. Communication between the OPC UA device and the ROS device is achieved via the interconnection device and the communication method.

18 Claims, 8 Drawing Sheets

(56) References Cited

U.S. PATENT DOCUMENTS

2019/0101904 A1* 4/2019 Shimamura .......... G05B 19/052
2019/0166202 A1* 5/2019 Nagata .................. H04L 67/125
2019/0182623 A1* 6/2019 Zhang .................. G08G 5/0069

FOREIGN PATENT DOCUMENTS

| CN | 106940561 A | 7/2017 |
| CN | 107838922 A | 3/2018 |
| CN | 108340352 A | 7/2018 |
| EP | 3182674 A1 | 6/2017 |

OTHER PUBLICATIONS

International Search Report and Written Opinion and English translation thereof dated Mar. 13, 2019.
Extended European Search Report dated Dec. 23, 2021.

* cited by examiner

INTERCONNECTION DEVICE, COMMUNICATION METHOD, AND SYSTEM INCLUDING ROBOT

PRIORITY STATEMENT

This application is the national phase under 35 U.S.C. § 371 of PCT International Application No. PCT/CN2018/098129, which has an International filing date of Aug. 1, 2018, which designated the United States of America, the entire contents of which are hereby incorporated herein by reference.

BACKGROUND

Field

Embodiments of the present application generally relate to the field of industrial standardization, and in particular, to an interconnection device, a communication method, and a system including a robot.

Background

OPC UA (OPC (Object Linking and Embedding for Process Control) Unified Architecture), as a new industrial 4.0 standardized communication protocol, aims at achieving interconnectivity and interoperability among fieldbuses in industrial automation, which realizes information integration from an enterprise equipment level to a management level. More and more industrial manufacturers provide products that may support the OPC UA, such as a PLC (Programmable Logic Controller).

On the other hand, a lot of work has been made to achieve heterogeneous network integration by means of the OPC UA, e.g., conversion from Profibus (Process Field Bus) and Modbus protocols to OPC (OLE (Object Linking and Embedding) for Process Control) data, OPC gateways for converting third-party DCS (Distributed Control System) process data to OPC data, and unified OPC UA gateways for collecting data from different supplier devices.

An ROS (Robot Operating System), as a flexible framework for robot development, provides a collection of tools and libraries, and may provide functions similar to an operating system for a heterogeneous computer cluster. It can simplify the complexity of development tasks and make robot behaviors on a multi-robot platform more robust. So far, more than 120 robot platforms use the ROS, and there are more than 2000 third-party software libraries available in the ROS. Robot suppliers also extend the ROS, and introduce high-level robotic software to the field of industrial automation. The ROS industry as an open source project has started with the support of a growing number of industrial robot suppliers. Robots are an indispensable part of intelligent manufacturing and flexible production in industry 4.0 and play an important role for integration among different industrial networks.

It is desired to provide a way to realize interconnection and interoperation between a device that supports the OPC UA and a device that supports the ROS.

SUMMARY

A brief overview of the present application is given below in order to provide a basic understanding of certain aspects and embodiments of the present application. It should be understood that this summary is not an exhaustive overview of the present application. It is not intended to determine key or important parts of the present application, nor is it intended to limit the scope of the present application. The purpose is merely to present some concepts in a simplified form as a prelude to the more detailed description that is discussed later.

According to one embodiment of the present application, provided is an interconnection device, to realize communication between an OPC UA device and an ROS device, including: a first OPC UA interface unit, configured to establish connection between the interconnection device and the OPC UA device; and at least one ROS interface unit, in communication with the first OPC UA interface unit. The ROS interface unit includes: at least one ROS node module, configured to perform communication between the OPC UA device and the ROS device; an ROS client library module, configured to provide a function library to be called when the ROS node module performs the communication; and an ROS core module, configured to manage the ROS node module in the ROS interface unit and a node module in the ROS device.

A communication method between an ROS device and an OPC UA device includes: sending, by the ROS device, information to the interconnection device according to an embodiment; performing, by the interconnection device, protocol conversion processing on the received information; and transmitting, by the interconnection device, the processed information to the OPC UA device for communication between the ROS device and the OPC UA device.

According to another embodiment of the present application, provided is a system including a robot, including: at least one device; a controller, configured to control the device; a robot; and the interconnection device according to an embodiment, where the controller is an OPC UA device, the robot is an ROS device, and the controller is configured to control, via the interconnection device, the robot to interact with the device.

Preferably, in one example of the embodiment, the robot includes a robot control system, the robot control system controls the robot, and the robot is connected to the interconnection device via the robot control system.

Preferably, in one example of the embodiment, the robot control system includes: an ROS subscription node module, configured to register at an ROS core module of the interconnection device so that the robot may subscribe to a topic; an ROS client node module, configured to register at the ROS core module so that the robot may call a service; and an ROS control packet module, configured to manage the ROS subscription node module and the ROS client node module.

BRIEF DESCRIPTION OF THE DRAWINGS

A further understanding of the nature and advantages of the present disclosure may be realized with reference to the following drawings. In the drawings, similar components or features may have the same or similar reference numerals.

REFERENCE NUMERALS

| | |
|---|---|
| 1, 2: Interconnection device | 12, 22: First OPC UA interface unit |
| 14, 24: ROS interface unit | 142: ROS node module |
| 144, 244: ROS client library module | 146, 246: ROS core module |
| 1422, 2422: ROS publishing node module | 1424, 2424: ROS serving node module |
| 4: OPC UA device | 6: ROS device |
| 400: Communication method between an OPC UA device and an ROS device | S402: The OPC UA device sends information to an interconnection device |
| S404: The interconnection device performs protocol conversion processing on the received information | S406: The interconnection device transmits the processed information to the ROS device |
| 500: Communication method between an ROS device and an OPC UA device | S502: The ROS device sends information to an interconnection device |
| S504: The interconnection device performs protocol conversion processing on the received information | S506: The interconnection device transmits the processed information to the OPC UA device |
| 60, 80: System including a robot | 602: Device |
| 604, 804: Controller | 606, 806: Robot |
| 6062, 8062: Robot control system | 60622, 80622: ROS subscription node module |
| 60624, 80624: ROS client node module | 60626, 80626: ROS control packet module |
| 802: Automated production line | 8042: OPC UA server module |
| 82: OPC UA client module | 808: Automated guided vehicle |

DETAILED DESCRIPTION OF THE EXAMPLE EMBODIMENTS

According to one embodiment of the present application, provided is an interconnection device, to realize communication between an OPC UA device and an ROS device, including: a first OPC UA interface unit, configured to establish connection between the interconnection device and the OPC UA device; and at least one ROS interface unit, in communication with the first OPC UA interface unit. The ROS interface unit includes: at least one ROS node module, configured to perform communication between the OPC UA device and the ROS device; an ROS client library module, configured to provide a function library to be called when the ROS node module performs the communication; and an ROS core module, configured to manage the ROS node module in the ROS interface unit and a node module in the ROS device.

Preferably, in one example of the embodiment, the ROS node module includes at least one of an ROS publishing node module and an ROS serving node module, where the ROS publishing node module is configured to perform topic communication between the OPC UA device and the ROS device; and the ROS serving node module is configured to perform service communication between the OPC UA device and the ROS device.

Preferably, in one example of the embodiment, the ROS publishing node module is further configured to publish information received from the first OPC UA interface unit to a related ROS device, the related ROS device being an ROS device that subscribes to a topic related to the received information; and the ROS serving node module is further configured to convert the information received from the first OPC UA interface unit into a format which may be called by the ROS device, and send the information subjected to format conversion to the ROS device.

Preferably, in one example of the embodiment, the first OPC UA interface unit may be connected to a second OPC UA interface unit included in the OPC UA device such that the interconnection device establishes connection to the OPC UA device.

Preferably, in one example of the embodiment, in a case where the second OPC UA interface unit is an OPC UA client, the first OPC UA interface unit is an OPC UA server; and in a case where the second OPC UA interface unit is an OPC UA server, the first OPC UA interface unit is an OPC UA client.

Preferably, in one example of the embodiment, the OPC UA device is a Programmable Logic Controller (PLC).

Preferably, in one example of the embodiment, an interface provided for the interconnection device is selected from a group consisting of Ethernet, Profinet, USB, and RS232.

According to another embodiment of the present application, provided is a communication method between an OPC UA device and an ROS device, including: sending, by the OPC UA device, information to the interconnection device according to the embodiment; performing, by the interconnection device, protocol conversion processing on the received information; and transmitting, by the interconnection device, the processed information to the ROS device for communication between the OPC UA device and the ROS device.

A communication method between an ROS device and an OPC UA device includes: sending, by the ROS device, information to the interconnection device according to an embodiment; performing, by the interconnection device, protocol conversion processing on the received information; and transmitting, by the interconnection device, the processed information to the OPC UA device for communication between the ROS device and the OPC UA device.

According to another embodiment of the present application, provided is a system including a robot, including: at least one device; a controller, configured to control the device; a robot; and the interconnection device according to an embodiment, where the controller is an OPC UA device, the robot is an ROS device, and the controller is configured to control, via the interconnection device, the robot to interact with the device.

Preferably, in one example of the embodiment, the controller includes a second OPC UA interface unit, and is configured to connect to the interconnection device via the second OPC UA interface unit.

Preferably, in one example of the embodiment, the robot includes a robot control system, the robot control system controls the robot, and the robot is connected to the interconnection device via the robot control system.

Preferably, in one example of the embodiment, the robot control system includes: an ROS subscription node module, configured to register at an ROS core module of the interconnection device so that the robot may subscribe to a topic; an ROS client node module, configured to register at the ROS core module so that the robot may call a service; and an ROS control packet module, configured to manage the ROS subscription node module and the ROS client node module.

Preferably, in one example of the embodiment, the device may be an automated production line.

Preferably, in one example of the embodiment, the robot control system is further configured to control the robot to interact with a third-party ROS device.

Preferably, in one example of the embodiment, the controller is an PLC.

According to the interconnection device, the communication method, and the system in an embodiment of the present invention, the ROS device may access OPC UA network information via a standardized OPC UA service, and a device in an ROS network may exchange data and commands with a device in an OPC UA network, thereby realizing cooperation between two different devices, so that the devices in the two networks may work independently or cooperatively.

According to the interconnection device, the communication method, and the system in an embodiment of the present invention, existing ROS-compatible devices in the ROS network may be easily integrated into an OPC UA-based control network from a device level to an enterprise management level without any change to hardware or software.

According to the interconnection device, the communication method, and the system in an embodiment of the present invention, the OPC UA client in the interconnection device receives commands and data from the ROS network via an ROS protocol, converts the ROS protocol into an OPC UA protocol, and ultimately calls related services of the OPC UA server. Thus, the ROS device may access all standardized OPC UA services. Similarly, the OPC UA device may also access the ROS device.

According to the interconnection device, the communication method, and the system in an embodiment of the present invention, connection of any device in the ROS network may be developed via a topic or service communication mode of the ROS. OPC UA-based ROS devices may be integrated into an OPC UA server in a high-level control system or a device-level industrial controller.

According to the interconnection device, the communication method, and the system in an embodiment of the present invention, interfaces of different standards may be provided, such as Ethernet, Profinet, USB, and RS232, so that the ROS network and the OPC UA network may be easily connected. Therefore, it is easy to integrate the ROS device into existing industrial PLC controllers and different control networks.

According to the interconnection device, the communication method, and the system in an embodiment of the present invention, interoperability and adaptability between an OPC UA-based device (e.g., an PLC controller) and third-party devices in an ROS system are greatly improved.

A subject described in this specification is discussed now with reference to example implementations. It should be understood that, discussion of these implementations is merely intended to make a person skilled in the art better understand and implement the subject described in this specification, and is not intended to limit the protection scope of the claims, the applicability, or examples. Changes may be made to the functions and arrangements of the discussed elements without departing from the protection scope of the content of the disclosure. Various processes or components may be omitted, replaced, or added in each example according to requirements. For example, the described method may be performed according to a sequence different from the sequence described herein, and steps may be added, omitted or combined. In addition, features described in some examples may also be combined in other examples.

As used in this specification, the term "include" and variants thereof represent open terms, and means "include but is not limited to". The term "based on" represents "at least partially based on". The terms "one embodiment" and "an embodiment" represent "at least one embodiment". The term "another embodiment" represents "at least one another embodiment". The terms "first", "second" and the like may represent different objects or the same object. Other definitions may be included explicitly or implicitly. Unless otherwise clearly specified, the definition of one term is consistent in the entire specification.

OPC UA (OPC (Object Linking and Embedding for Process Control) Unified Architecture), as a new industrial 4.0 standardized communication protocol, may achieve interconnectivity and interoperability among fieldbuses in industrial automation. An ROS (Robot Operating System), as a flexible framework for robot development, provides a collection of tools and libraries, and may provide functions similar to an operating system for a heterogeneous computer cluster.

However, so far, little attention has been paid to achieving interoperation between an ROS-based device and an OPC UA-based device by interconnection between the two devices.

According to one embodiment of the present invention, provided is an interconnection device, which may realize communication between an ROS-based device and an OPC UA-based device.

By implementing conversion between OPC UA and ROS protocols, new OPC UA standards may be integrated into existing ROS networks such that OPC UA devices access ROS network information in a uniform manner defined by the OPC UA. Similarly, with a gateway device, ROS-compatible devices in the ROS network may access the OPC UA standards without modifying hardware or software and may exchange information with the OPC UA-based device or network.

In the present application, to make the expression more concise, devices supporting an OPC UA protocol, or OPC UA-compatible devices in an OPC UA network are collectively referred to as an OPC UA device. ROS framework-based devices or ROS-compatible devices in the ROS network are collectively referred to as an ROS device. A person skilled in the art could clearly understand the meanings of the OPC UA device and the ROS device.

An interconnection device, a communication method, and a system including a robot according to embodiments of the present invention are now described in combination with the accompanying drawings.

Figure 1:
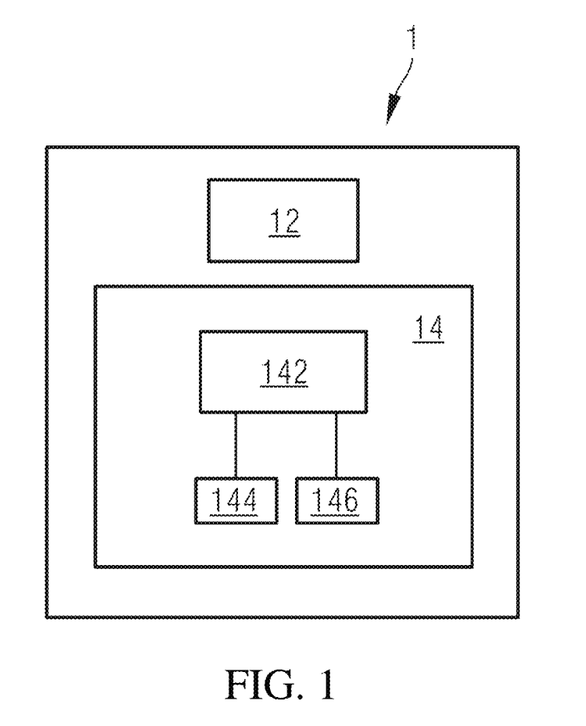
FIG. 1 is a block diagram of an example configuration of an interconnection device 1 according to one embodiment of the present invention.

FIG. 1 is a schematic diagram of an interconnection device 1 capable of realizing communication between an OPC UA device and an ROS device according to one embodiment of the present invention.

As shown in FIG. 1, the interconnection device 1 includes a first OPC UA interface unit 12 and an ROS interface unit 14. The interconnection device 1 establishes connection to an OPC UA device via the first OPC UA interface unit 12. The OPC UA device may be, for example, a PLC (Programmable Logic Controller).

The ROS interface unit 14 includes at least one ROS node module 142, an ROS client library module 144, and an ROS core module 146.

The ROS node module 142 may perform communication between the OPC UA device and an ROS device.

Figure 2:
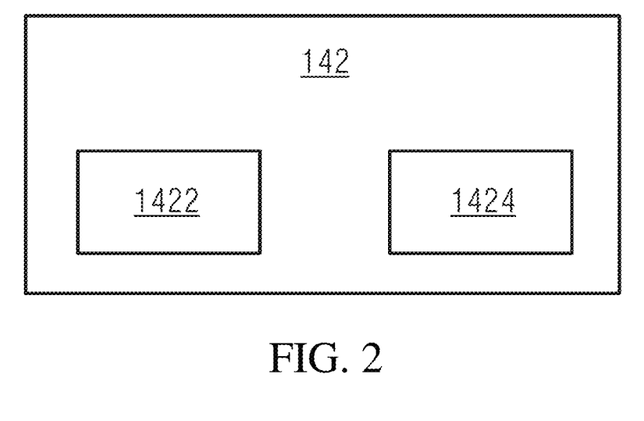
FIG. 2 is a block diagram of an example configuration of an ROS node module 142 in FIG. 1.

FIG. 2 is a block diagram of an example configuration of an ROS node module 142 in FIG. 1. As shown in FIG. 2, the ROS node module 142 may include an ROS publishing node module 1422 and an ROS serving node module 1424.

In an ROS network, the communication mode of an ROS node may be based on publishing and subscription mechanisms, i.e., a topic communication mode. For example, the ROS node may send a message by publishing information to a given topic. The "topic" here is the name used to identify the content of the information. The ROS node interested in a certain type of data may subscribe to a topic associated with said data. As long as a node sends information about the topic, the ROS node subscribing to the topic may receive the message. In the topic communication mode, the sent data may be interacted in many-to-many fashion. However, if a request or response needs to be obtained from a certain node, it cannot be achieved by means of the topic communication mode. In this case, a service communication mode may be employed to allow for interaction directly with a certain node.

In an example of the present invention, the topic communication mode between an OPC UA device and an ROS device may be implemented by means of the ROS publishing node module 1422. In particular, the ROS publishing node module 1422 publishes information received from the first OPC UA interface unit 12 to a related ROS device, the related ROS device herein being an ROS device that subscribes to a topic related to the received information.

The ROS serving node module 1424 may realize the service communication mode between the OPC UA device and the ROS device. In particular, the ROS serving node module 1424 converts the information received from the first OPC UA interface unit 12 into a format which may be called by the ROS device, and sends the information subjected to format conversion to the ROS device. The ROS device may respond to the information after receiving the information.

An ROS client library module 144 provides a function library to be called when the ROS node module 142 performs the communication.

An ROS core module 146 is configured to manage the ROS node module 142 in the ROS interface unit 14 and a node module in the ROS device external to the interconnection device 1. For example, both the ROS publishing node module 1422 and the ROS serving node module 1424 in the ROS node module 142 register at the ROS core module 146.

In one example, connection between the interconnection device 1 and the OPC UA device is established by means of connection between the first OPC UA interface unit 12 and a second OPC UA interface unit included in the OPC UA device.

A person skilled in the art could understand that the first OPC UA interface unit 12 may be implemented as a client or a server. In a case where the second OPC UA interface unit included in the OPC UA device is implemented as an OPC UA client, the first OPC UA interface unit 12 is implemented as an OPC UA server; and in a case where the second OPC UA interface unit is implemented as an OPC UA server, the first OPC UA interface unit 12 is implemented as an OPC UA client.

Preferably, the interconnection device 1 according to one embodiment of the present invention may employ a Linux operating system.

Figure 3:
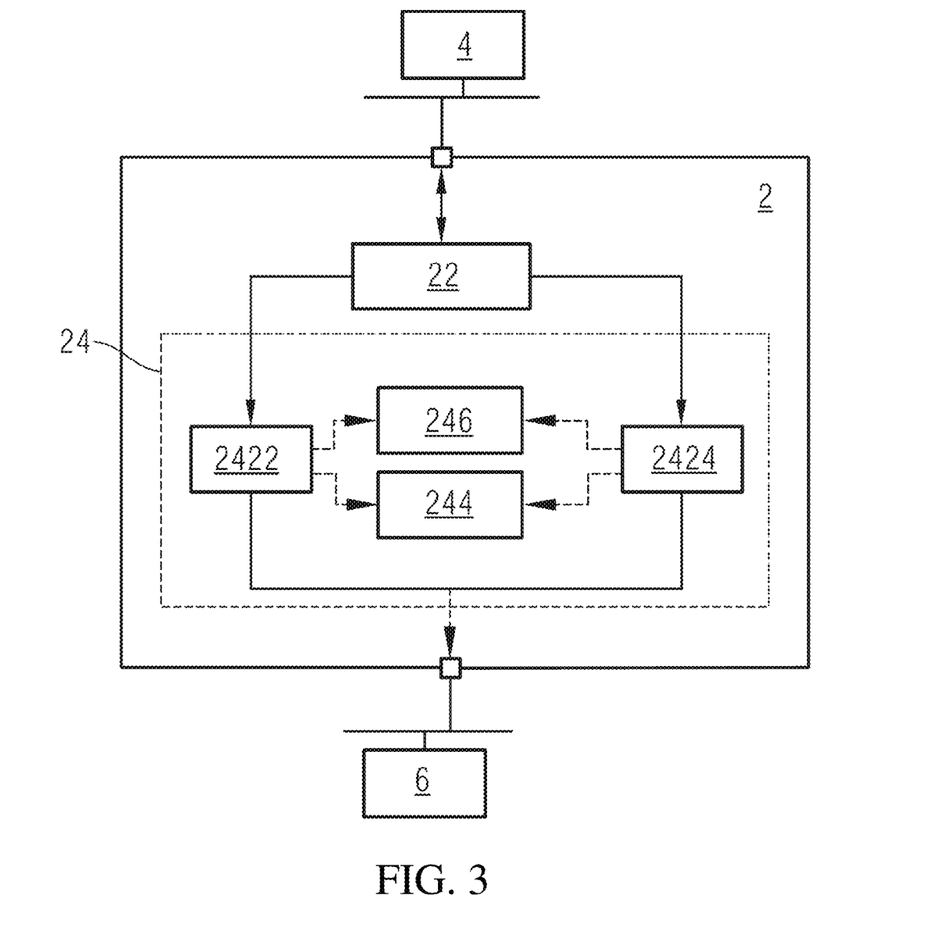
FIG. 3 is an application example of an interconnection device 2 according to one embodiment of the present invention.

FIG. 3 is an application example of an interconnection device 2 according to one embodiment of the present invention. In FIG. 3, an OPC UA device 4 is in communication with an ROS device 6 via the interconnection device 2.

In one example, the interconnection device 2 may be connected to the OPC UA device 4 and the ROS device 6 by means of an Ethernet port. A person skilled in the art could understand that the connection mode between the interconnection device 2 and the OPC UA device 4 and the ROS device 6 is not limited to the Ethernet port and may also be ports such as Profinet, USB, and RS232.

In FIG. 3, the interconnection device 2 includes a first OPC UA interface unit 22 and an ROS interface unit 24, where the ROS interface unit 24 includes an ROS client library module 244, an ROS core module 246, an ROS publishing node module 2422, and an ROS serving node module 2424.

The ROS publishing node module 2422 performs topic communication with the first OPC UA interface unit 22 and the ROS device 6, and the ROS serving node module 2424 performs service communication with the first OPC UA interface unit 22 and the ROS device 6.

The communication functions of the OPC UA device 4 and the ROS device 6 may be implemented by means of the ROS publishing node module 2422 and the ROS serving node module 2424, for example, the ROS publishing node module 2422 may publish a particular topic for subscription, and the ROS serving node module 2424 may provide services for calling.

The operations of the first OPC UA interface unit 22, the ROS client library module 244, and the ROS core module 246 in FIG. 3 are similar to those of the corresponding modules in FIG. 1, and details are not described herein again.

Figure 4:
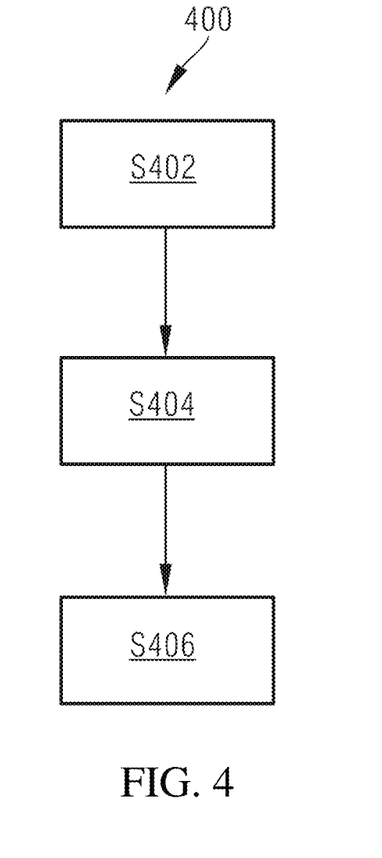
FIG. 4 is an example flowchart of a communication method between an OPC UA device and an ROS device according to one embodiment of the present invention.

FIG. 4 is an example flowchart of a communication method between an OPC UA device and an ROS device according to one embodiment of the present invention.

The method 400 shown in FIG. 4 is performed by connecting an interconnection device 1 or 2 as described above between the OPC UA device and the ROS device.

As shown in FIG. 4, in block S402, the OPC UA device sends information to the interconnection device.

In block S404, the interconnection device performs protocol conversion processing on the received information.

For example, a first OPC UA interface unit in the interconnection device receives commands and data from the OPC UA device via an OPC UA protocol, and the interconnection device converts the OPC UA protocol into an ROS protocol such that the OPC UA device may access the ROS device.

In block S406, the interconnection device transmits the processed information to the ROS device for communication between the OPC UA device and the ROS device.

Figure 5:
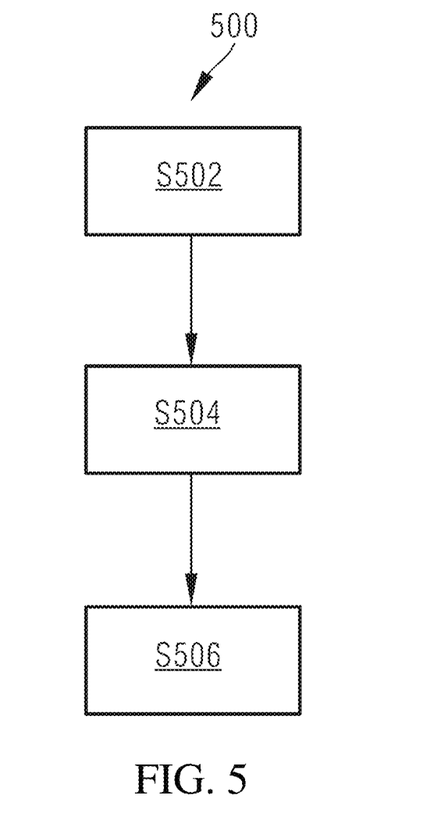
FIG. 5 is an example flowchart of a communication method between an ROS device and an OPC UA device according to one embodiment of the present invention.

FIG. 5 is an example flowchart of a communication method between an ROS device and an OPC UA device according to one embodiment of the present invention.

The method 500 shown in FIG. 5 is also performed by connecting an interconnection device 1 or 2 as described above between the ROS device and the OPC UA device.

As shown in FIG. 5, in block S502, the ROS device sends information to the interconnection device.

In block S504, the interconnection device performs protocol conversion processing on the received information.

For example, the ROS interface unit in the interconnection device may receive commands and data from the ROS device via an ROS protocol, and the interconnection device performs protocol conversion processing and converts the ROS protocol into an OPC UA protocol such that the ROS device may call related services of an OPC UA server.

In block S506, the interconnection device transmits the processed information to the OPC UA device for communication between the OPC UA device and the ROS device. For the operations of blocks S404 and S504, reference is made for the operations of the interconnection device 1 or 2 described above with reference to FIGS. 1-3, and details are not described herein again.

Figure 6:
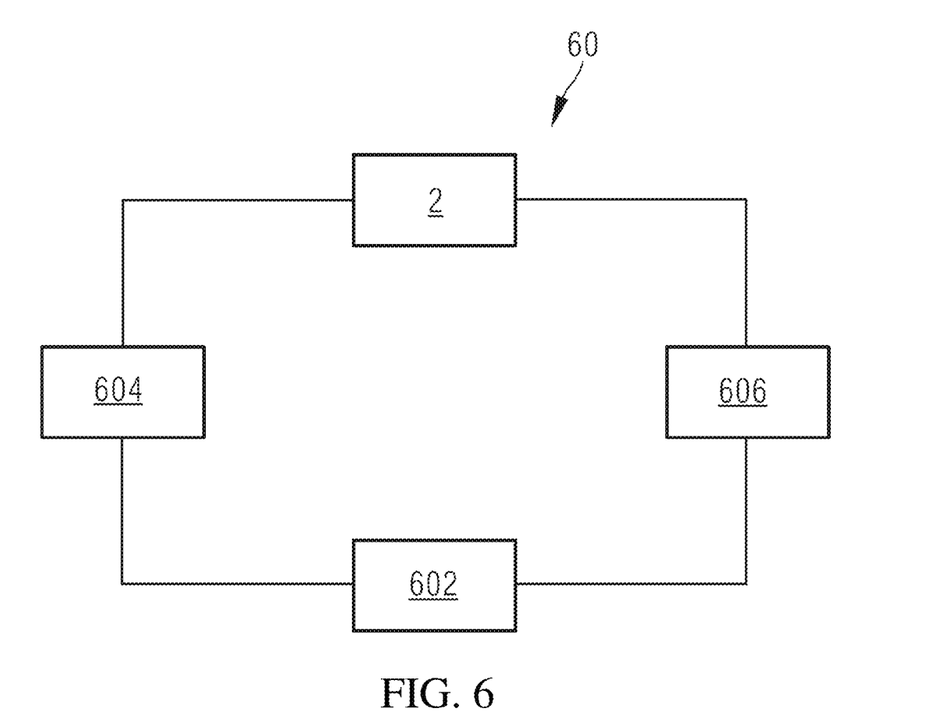
FIG. 6 is a schematic diagram of a system 60 including a robot according to one embodiment of the present invention.

FIG. 6 is a schematic diagram of a system 60 including a robot according to one embodiment of the present invention.

As shown in FIG. 6, the system 60 may include: at least one device 602, a controller 604, at least one robot 606, and the interconnection device 1 or 2 described above with reference to FIGS. 1-3. Description is made by taking a system 60 including the interconnection device 2 as an example below.

In the system 60, the controller 604 is an OPC UA device and configured to control the device 602, the robot 606 is an ROS device, and the controller 604 controls, via the interconnection device 2, the robot 606 to interact with the device 602. In one example, the controller 604 may be an PLC.

The controller 604 may include a second OPC UA interface unit (not shown in FIG. 6, see 8042 in FIG. 8 below), and the controller 604 may establish connection with the interconnection device 2 by means of the connection between the second OPC UA interface unit and the first OPC UA interface unit 22 of the interconnection device 2.

In a case where the second OPC UA interface unit is implemented as an OPC UA server, the first OPC UA interface unit 22 in the interconnection 2 is implemented as an OPC UA client; and in a case where the second OPC UA interface unit is implemented as an OPC UA client, the first OPC UA interface unit 22 is implemented as an OPC UA server.

Only one robot 606 is shown in FIG. 6. However, the system 60 including the robot according to one embodiment of the present invention may also include a plurality of robots, and the controller 604 may control the plurality of robots by means of the interconnection device 2. A person skilled in the art could understand that the operation process that the controller 604 controls a plurality of robots is similar to the operation process that the controller 604 controls a robot 606, details are not described herein again.

Figure 7:
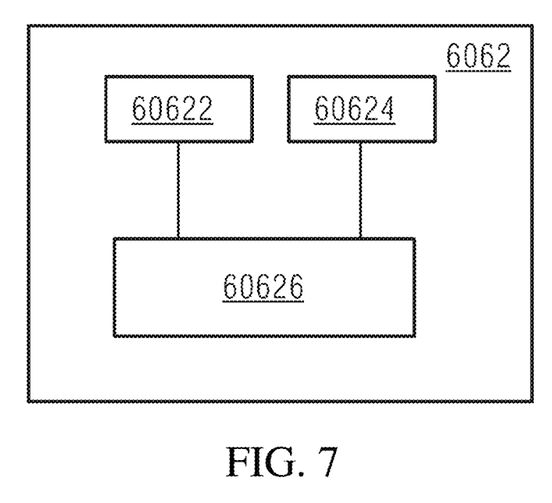
FIG. 7 is a block diagram of an example configuration of a robot control system 6062 in FIG. 6.

The robot 606 may include a robot control system 6062 which is used for controlling the robot 606. The robot 606 may be connected to the interconnection device 2 via the robot control system 6062. FIG. 7 is a block diagram of an example configuration of a robot control system 6062 of FIG. 6. As shown in FIG. 7, the robot control system 6062 includes: an ROS subscription node module 60622, an ROS client node module 60624, and an ROS control packet module 60626.

The ROS subscription node module 60622 is configured to register at the ROS core module 246 of the interconnection device 2 so that the robot 606 may subscribe to a topic.

The ROS client node module 60624 is configured to register at the ROS core module 246 so that the robot 606 may call a service.

The ROS control packet module 60626 is configured to manage the ROS subscription node module 60622 and the ROS client node module 60624.

Operations of a system 80 including a robot according to another embodiment of the present invention are described below with reference to FIG. 8.

Figure 8:
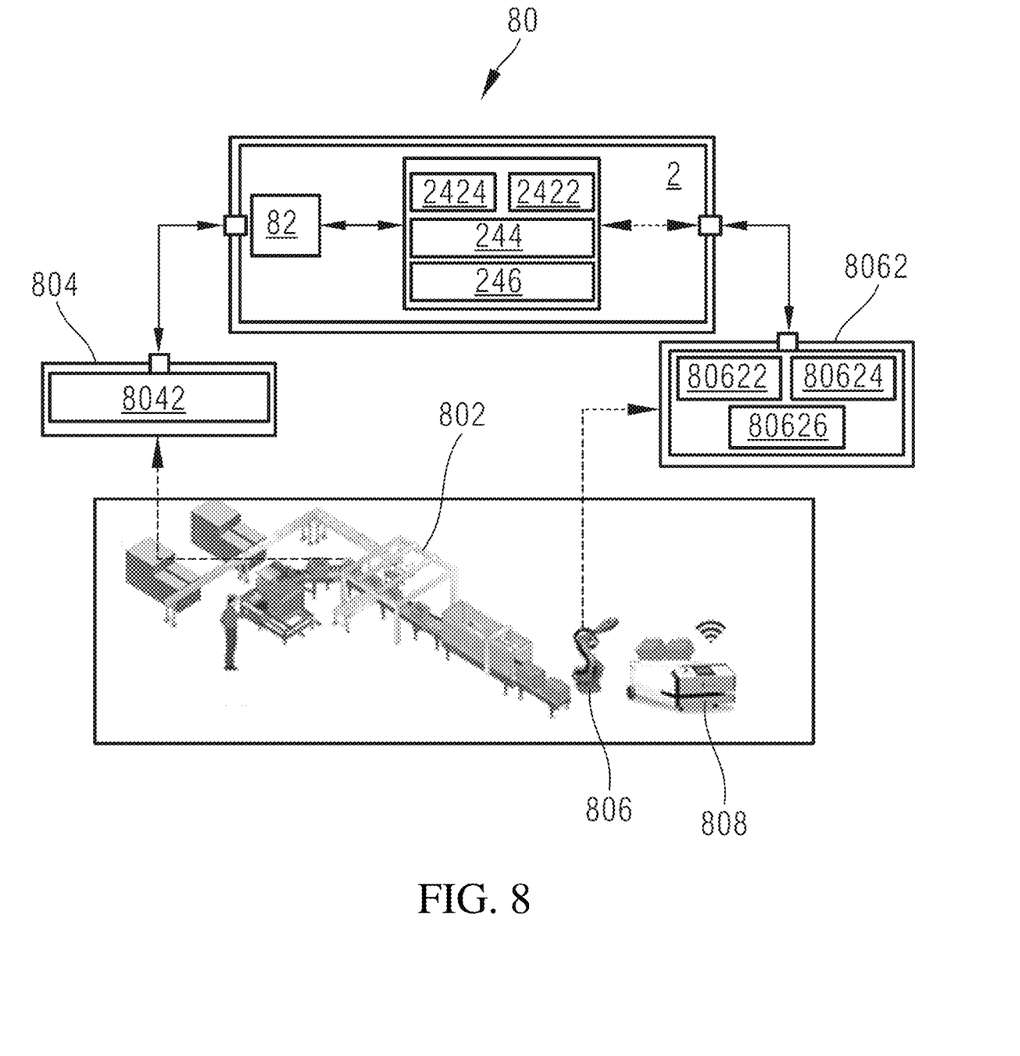
FIG. 8 is a schematic diagram of a system 80 including a robot according to another embodiment of the present invention.

In FIG. 8, the system 80 includes an automated production line 802, a controller 804, a robot 806, and an interconnection device 2.

In the embodiment shown in FIG. 8, the interconnection device 2 is a gateway device.

The controller 804 may be a PLC controller for controlling the production of the automated production line 802. The controller 804 includes an OPC UA server module 8042 that may be in communication with the outside using an OPC UA protocol.

The interconnection device 2 includes an OPC UA client module 82, and the OPC UA server module 8042 of the controller 804 is connected to the OPC UA client module 82 of the interconnection device 2, thereby establishing connection between the controller 804 and the interconnection device 2.

The robot 806 may be an ROS-compatible industrial robot and includes a robot control system 8062. The robot 806 may be connected to the interconnection device 2 via the robot control system 8062.

Only one robot 806 is shown in FIG. 8. However, a person skilled in the art could understand that the system 80 may also include a plurality of robots.

The controller 804 may control the robot control system 8062 via the interconnection device 2 to control the robot 806.

The operations of the modules of the interconnection device 2 and the ROS subscription node module 80622, the ROS client node module 80624, and the ROS control packet module 80626 included in the robot control system 8062 are similar to those of the corresponding modules described above with reference to FIGS. 2 and 7, and details are not described herein again.

An Automated Guided Vehicle (AGV) 808 is also shown in FIG. 8, and is an ROS-compatible third-party device. The robot control system 8062 may also control the robot 806 to interact with the AGV 808.

In the example of FIG. 8, description is made by taking the controller including the OPC UA server module and the interconnection device including the OPC UA client module as an example below. A person skilled in the art could understand that the controller includes the OPC UA client module and the interconnection device includes the OPC UA server module. In this case, the operations of the controller and the interconnection device are similar, and details are not described herein again.

An example workflow of the system 80 shown in FIG. 8 is described below by taking the automated production line 802 being an automated production line for packaging a product as an example.

First, it is needed to initialize the gateway device 2 and the ROS device (robot) 806 in the system 80. The initialization process may be as follows.

The ROS publishing node module 2422 registers at the ROS core module 246 to publish a particular topic.

The ROS subscription node module 80622 registers at the ROS core module 246 to subscribe to a particular topic.

The ROS control packet module 80626 registers all node modules managed thereby at the ROS core module 246.

The ROS serving node module 2424 and the ROS client node module 80624 register at the ROS core module 246 so that the robot 806 may perform service communication.

An OPC UA client 22 calls a connection service to establish communication with the OPC UA server module 8042 in the controller 804.

The OPC UA client 22 calls a subscription service to add monitoring variables defined in an address space of the OPC UA server module 8042.

The ROS publishing node module 2422 registers a callback function at the OPC UA client 22. When the OPC UA client 22 receives data from the OPC UA server module 8042, the callback function is called to send the data to the ROS publishing node module 2422.

After the initialization process of the gateway device 2 and the robot 806 in the system 80 is completed, the controller 804 may perform communication by means of the gateway device 2 and the robot 806.

One specific example of the control process that the controller 804 controls the robot 806 after the packaging of each product is completed at the automated production line 802 is described below.

A certain device (e.g., a sensor) of the automated production line 802 may transmit a control signal to the controller 804 by means of a digital input channel, and a variable value corresponding to the digital input channel changes from 0 to 1.

When the OPC UA client 22 in the interconnection device 2 monitors a change in the variable value of the subscribed digital input channel, an interface (i.e., the callback function) of the ROS publishing node module is called to transmit the current data.

The ROS publishing node module publishes the variable value by means of the ROS topic, and the ROS subscription node module of the robot control system may obtain the current value by means of subscription.

When the ROS subscription node module detects a change in the variable value, a control command is sent to an ROS control packet, which may control the robot to pick up and place the packaged products onto the AGV.

After the AGV is full of products, the robot is noticed to place the products on another AGV by sending a signal by means of a topic or service communication mode of the ROS.

The workflow of the system 80 described above is merely one specific example of communication between the OPC UA device and the ROS device. A person skilled in the art could understand that any desired communication may be performed between the OPC UA device and the ROS device by means of the interconnection device according to one embodiment of the present invention, which is not limited to the above-described workflow.

Based on the description above, according to the interconnection device, the communication method, and the system in the present invention, the ROS device may access OPC UA network information via a standardized OPC UA service, and a device in an ROS network may exchange data and commands with a device in an OPC UA network, thereby realizing cooperation between two different devices, so that the devices in the two networks may work independently or cooperatively.

According to the interconnection device, the communication method, and the system in the present invention, existing ROS-compatible devices in the ROS network may be easily integrated into an OPC UA-based control network from a device level to an enterprise management level without any change to hardware or software.

According to the interconnection device, the communication method, and the system in the present invention, the OPC UA client in the interconnection device receives commands and data from the ROS network via an ROS protocol, converts the ROS protocol into an OPC UA protocol, and ultimately calls related services of the OPC UA server. Thus, the ROS device may access all standardized OPC UA services. Similarly, the OPC UA device may also access the ROS device.

According to the interconnection device, the communication method, and the system in the present invention, connection of any device in the ROS network may be developed via a topic or service communication mode of the ROS. OPC UA-based ROS devices may be integrated into an OPC UA server in a high-level control system or a device-level industrial controller.

According to the interconnection device, the communication method, and the system in the present invention, interfaces of different standards may be provided, such as Ethernet, Profinet, USB, and RS232, so that the ROS network and the OPC UA network may be easily connected. Therefore, it is easy to integrate the ROS robot into existing industrial PLC controllers and different control networks.

According to the interconnection device, the communication method, and the system in the present invention, interoperability and adaptability between an OPC UA-based device (e.g., an PLC controller) and third-party devices in an ROS system are greatly improved.

Example embodiments are described above in combination with specific implementations illustrated in the accompanying drawings, but this does not represent all embodiments that may be implemented or fall within the protection scope of the claims. A term "example" used in the entire specification means "used as an example, an instance, or an illustration", and does not mean "preferred" or "superior" over other embodiments. To provide an understanding of the described technologies, the specific implementations include specific details. However, these technologies may be implemented without these specific details. In some embodiments, to avoid confusing the concept of the described embodiments, a well-known structure and apparatus are shown in a block diagram form.

The descriptions of the content of the present disclosure are provided to allow any person of ordinary skill in the art to implement or use the content of the present disclosure. For a person of ordinary skill in the art, various modifications on the content of the present disclosure are obvious. In addition, a general principle defined in this specification may be applied to other variants without departing from the protection scope of the content of the present disclosure. Therefore, the content of the present disclosure is not limited to the examples and designs described in this specification, but is consistent with the widest range conforming to the principle and novelty disclosed in this specification.

What is claimed is:

1. An interconnection device to realize communication between an Object Linking and Embedding for Process Control Unified Architecture (OPC UA) device and Robot Operating System (ROS) device, comprising:
   a first OPC UA interface, configured to establish connection between the interconnection device and the OPC UA device; and
   at least one ROS interface, for communication with the first OPC UA interface, the at least one ROS interface including
      at least one ROS node module configured to perform communication between the OPC UA device and the ROS device,
      an ROS client library module, configured to provide a function library to be called upon the ROS node module performing the communication, and
      an ROS core module configured to manage the ROS node module in the ROS interface and a node module in the ROS device, wherein
   the ROS node module includes at least one of an ROS publishing node module and an ROS serving node module,
   the ROS publishing node module is configured to perform topic communication between the OPC UA device and the ROS device,
   the ROS serving node module is configured to perform service communication between the OPC UA device and the ROS device,
   the ROS publishing node module is further configured to publish information received from the first OPC UA interface to a related ROS device, the related ROS device being an ROS device that subscribes to a topic related to the received information, and
   the ROS serving node module is further configured to convert the information received from the first OPC UA interface into a format callable by the ROS device, and send the information subjected to format conversion to the ROS device.

2. The interconnection device of claim 1, wherein the first OPC UA interface is connectable to a second OPC UA interface unit included in the OPC UA device.

3. The interconnection device of claim 2, wherein
   upon the second OPC UA interface being an OPC UA client, the first OPC UA interface is an OPC UA server; and
   upon the second OPC UA interface being an OPC UA server, the first OPC UA interface is an OPC UA client.

4. The interconnection device of claim 3, wherein the first OPC UA interface is connectable to a second OPC UA interface unit included in the OPC UA device.

5. The interconnection device of claim 4, wherein
   upon the second OPC UA interface being an OPC UA client, the first OPC UA interface is an OPC UA server; and
   upon the second OPC UA interface being an OPC UA server, the first OPC UA interface is an OPC UA client.

6. The interconnection device of claim 2, wherein the OPC UA device is a programmable logic controller.

7. The interconnection device of claim 1, wherein the OPC UA device is a programmable logic controller.

8. The interconnection device of claim 1, wherein an interface provided for the interconnection device is selected from a group consisting of Ethernet, Profinet, USB, and RS232.

9. A communication method between an Object Linking and Embedding for Process Control Unified Architecture (OPC UA) device and Robot Operating System (ROS) device, comprising:
   sending, by the OPC UA device, information to an interconnection device including
      a first OPC UA interface, configured to establish connection between the interconnection device and the OPC UA device; and
      at least one ROS interface, for communication with the first OPC UA interface, the at least one ROS interface including
         at least one ROS node module, configured to perform communication between the OPC UA device and the ROS device,
         an ROS client library module, configured to provide a function library to be called upon the ROS node module performing the communication, and
         an ROS core module, configured to manage the ROS node module in the ROS interface and a node module in the ROS device, wherein
      the ROS node module includes at least one of an ROS publishing node module and an ROS serving node module,
      the ROS publishing node module is configured to perform topic communication between the OPC UA device and the ROS device,
      the ROS serving node module is configured to perform service communication between the OPC UA device and the ROS device,
      the ROS publishing node module is further configured to publish information received from the first OPC UA interface to a related ROS device, the related ROS device being an ROS device that subscribes to a topic related to the received information, and
      the ROS serving node module is further configured to convert the information received from the first OPC UA interface into a format callable by the ROS device, and send the information subjected to format conversion to the ROS device;
   performing, by the interconnection device, protocol conversion processing on the received information; and
   transmitting, by the interconnection device, the processed information to the ROS device for communication between the OPC UA device and the ROS device.

10. A communication method between Robot Operating System (ROS) device and an Object Linking and Embedding for Process Control Unified Architecture (OPC UA device), comprising:
   sending, by the ROS device, information to an interconnection device, the interconnection device including
      a first OPC UA interface, configured to establish connection between the interconnection device and the OPC UA device; and
      at least one ROS interface, for communication with the first OPC UA interface, the at least one ROS interface including
         at least one ROS node module, configured to perform communication between the OPC UA device and the ROS device,
         an ROS client library module, configured to provide a function library to be called upon the ROS node module performing the communication, and
         an ROS core module, configured to manage the ROS node module in the ROS interface and a node module in the ROS device, wherein the ROS node module includes at least one of an ROS publishing node module and an ROS serving node module, the ROS publishing node module is configured to perform topic communication between the OPC UA device and the ROS device, the ROS serving node module is configured to perform service communication between the OPC UA device and the ROS device, the ROS publishing node module is further configured to publish information received from the first OPC UA interface to a related ROS device, the related ROS device being an ROS device that subscribes to a topic related to the received information, and the ROS serving node module is further configured to convert the information received from the first OPC UA interface into a format callable by the ROS device, and send the information subjected to format conversion to the ROS device;

performing, by the interconnection device, protocol conversion processing on the received information; and transmitting, by the interconnection device, the processed information to the OPC UA device for communication between the ROS device and the OPC UA device.

11. A system, comprising:

at least one device;

a controller configured to control the at least one device;

at least one robot; and an interconnection device configured to permit communication between an Object Linking and Embedding for Process Control Unified Architecture (OPC UA) device and a Robot Operating System (ROS) device, the interconnection device including, a first OPC UA interface, configured to establish connection between the interconnection device and the OPC UA device; and at least one ROS interface, for communication with the first OPC UA interface, the at least one ROS interface including at least one ROS node module configured to perform communication between the OPC UA device and the ROS device, an ROS client library module configured to provide a function library to be called upon the ROS node module performing the communication, and an ROS core module configured to manage the ROS node module in the ROS interface and a node module in the ROS device, wherein the ROS node module includes at least one of an ROS publishing node module and an ROS serving node module, the ROS publishing node module is configured to perform topic communication between the OPC UA device and the ROS device, the ROS serving node module is configured to perform service communication between the OPC UA device and the ROS device, the ROS publishing node module is further configured to publish information received from the first OPC UA interface to a related ROS device, the related ROS device being an ROS device that subscribes to a topic related to the received information, the ROS serving node module is further configured to convert the information received from the first OPC UA interface into a format callable by the ROS device, and send the information subjected to format conversion to the ROS device, and the controller is the OPC UA device, the robot is the ROS device, and the controller is configured to control, via the interconnection device, the at least one robot to interact with the at least one device.

12. The system of claim 11, wherein the controller includes an OPC UA interface, and is configured to connect to the interconnection device via the OPC UA interface.

13. The system of claim 12, wherein the at least one robot includes a robot control system;

the robot control system is configured to control an operation of the at least one robot; and the at least one robot is connected to the interconnection device via the robot control system.

14. The system of claim 11, wherein the at least one robot includes a robot control system;

the robot control system is configured to control an operation of the at least one robot; and the at least one robot is connected to the interconnection device via the robot control system.

15. The system of claim 14, wherein the robot control system includes:

an ROS subscription node module configured to register at the ROS core module of the interconnection device to permit the at least one robot to subscribe to a topic;

an ROS client node module configured to register at the ROS core module to permit the at least one robot to call a service; and an ROS control packet module configured to manage the ROS subscription node module and the ROS client node module.

16. The system of claim 14, wherein the robot control system is further configured to control the at least one robot to interact with a third-party ROS device.

17. The system of claim 11, wherein the at least one device is at least part of an automated production line.

18. The system of claim 11, wherein the controller is a programmable logic controller.

* * * * *